May 12, 1953 — R. M. SHERMAN ET AL — 2,638,362
COUPLING
Filed Oct. 7, 1949 — 5 Sheets-Sheet 1

INVENTORS
ROGER M. SHERMAN
ALEXANDER S. MULLGARDT
CLOYD E. GRAY
BY
ATTORNEY

May 12, 1953   R. M. SHERMAN ET AL   2,638,362
COUPLING
Filed Oct. 7, 1949   5 Sheets-Sheet 3

INVENTORS
ROGER M. SHERMAN
ALEXANDER S. MULLGARDT
CLOYD E. GRAY
BY
ATTORNEY

May 12, 1953 R. M. SHERMAN ET AL 2,638,362
COUPLING
Filed Oct. 7, 1949 5 Sheets-Sheet 5

INVENTORS
ROGER M. SHERMAN
ALEXANDER S. MULLGARDT
CLOYD E. GRAY
BY
ATTORNEY

Patented May 12, 1953

2,638,362

UNITED STATES PATENT OFFICE 2,638,362

COUPLING

Roger M. Sherman, Los Gatos, Alexander S. Mullgardt, Altadena, and Cloyd E. Gray, Palo Alto, Calif., assignors to W. R. Ames Company, San Francisco, Calif., a corporation of California Application October 7, 1949, Serial No. 120,056

4 Claims. (Cl. 285—91)

This invention relates to improvements in mechanically interlocked couplings and is illustrated herein as it is applied in coupling together sections of pipe.

Many problems have been encountered in providing an effective, securely fastened coupling for connecting together sections of pipe such as that used by farmers for irrigation in the field or that used by contractors in construction projects, and the present structure is believed to offer an especially practical solution to these problems.

Aside from the screw-threaded coupling or the bolted-flanged coupling, the quickly severable couplings have generally been of two distinct types:

1. The friction-grip type of structure, typified by the disclosures in the U. S. patents to Noble No. 1,508,026, Beyer Nos. 2,184,376 and 2,259,453, Spang No. 2,017,994, and Santiago No. 1,928,821.

2. The rigid mechanical interlock type of structure typified by the disclosure in the U. S. patent to Matthiessen No. 2,069,377. The present invention is for improvements in structures of the latter type as distinguished from the friction grip type.

In the friction-grip type of structure, the smooth cylindrical end portion of one pipe section slips into the female end of a coupling collar secured on the end of the adjacent pipe section. The inner wall of the coupling collar is tapered, and a flexible compression ring fits between the tapered wall and the plain cylindrical wall of the male member. A piston-like rubber ring-gasket is fitted to seal on said cylindrical wall and to seal against the tapered wall of the collar. If the male member is inside the collar and if pressure is applied to the fluid in the pipe, the piston-like rubber ring will push against the flexible compression ring, causing the taper to compress the flexible compression ring into a friction-grip hold on the cylindrical wall of the male member. As said by the Noble Patent 1,508,026, page 2, line 20, "This compression becomes greater in proportion to the increase in intensity in the force applied."

As distinguished from the friction-grip coupling just described, the holding in the mechanical interlock type of coupler is effected by having the surface of the male member ball-like and not cylindrical, so that there are circular portions of different diameters along its surface. The female element of the coupling likewise has non-cylindrical circular portions of different diameters. The diameters of the male and of the female portions of the coupling members must bear a definite relation to each other and to a mechanical locking ring located between them. For the coupling to function, the distance between the engaged diameters must be less than the effective radial diameter of the locking ring. In this way the locking ring effects a positive mechanical interlock on the male member independent of friction. A piston-like rubber ring gasket moves the locking ring into locking position each time the coupling is first engaged. The interlock is also independent of how much line-pressure is maintained on this gasket. The strength of the coupling effect has nothing to do with friction or with the fluid pressure in the pipe line. In other words, the locking ring comes in between the coupling parts and they cannot be separated, no matter how strong the axial pull, until the locking ring is displaced.

The positive mechanical interlock coupling of the present invention is characterized by the ease with which it may be connected and disconnected; by the positive locking together of the parts when connected; by its ability to hold without leaks when adjacent pipes are misaligned; by its ability to hold an angular displacement without tending to straighten; by remaining tight when the fluid pressure diminishes or is completely shut off; by its adaptability to a multitude of types of conditions where pipe may be used; by its relatively low production cost; and, by its generally fool-proof operation.

These and other advantages are achieved by this coupling which has a male element of a generally spherical shape. The female element is in the form of a bell or sleeve, which is tapered inwardly near its outer end and is inturned at the very end to form a lip of a diameter only slightly larger than the male member or ball. The locking is effected by a garter spring which is moved into locking position against the bell lip of the tapered portion of the bell. The spring thus is capable of coming down behind the ball, when the latter is inserted in the bell, and there acts positively to prevent its withdrawal, without being at all dependent on the pressure of the fluid in the pipe. The spring is moved into locking position by a sliding gasket placed in the bell adjacent the spring. The gasket is moved when pressure comes on the fluid in the line. The gasket may move simultaneously with the male element or it may move independently of it.

Other advantages and features of the invention will appear from the following detailed description of several embodiments thereof. In accordance with United States Revised Statutes, section 4888, the description is specific, but the invention is not intended to be limited hereby to these illustrative embodiments.

In the drawings:

Figs. 16 and 17 are views in elevation and in section indicating the relation between possible stable disalignment and the diameter of the coupling ball, for a given size of pipe. Fig. 16 shows a smaller diameter ball in its two extreme positions of disalignment, the lower position being shown in dotted lines. Fig. 17 is a similar view of a pipe of the same size coupled by a larger diameter ball, so that the pipe can be disaligned over a larger angle.

In all forms of the invention shown here, the male coupling member terminates in a generally spherical surface or ball. The female member has a flared bell-like member to receive the male member. In this flared member a gasket and a spring are positioned, the latter being retained within the member by a turned-in lip. The male member is inserted into the female member past the spring and in engagement with the piston-like gasket. When water or other fluid under pressure passes through the pipe line, the gasket and the spring move toward the lip in the female member. This causes the spring diameter to diminish because of the tapered wall until the spring comes to rest against the lip. Further movement of the male member brings its ball portion against the spring. Since in this position the spring's inside diameter is smaller than the male member's outside diameter there is a positive interlock of the coupling parts.

The form of the invention shown in Figs. 1 to 4 is distinguished from the other forms illustrated here by having a gasket whose inner lip is snugly engaged with the ball on the male member when the latter is inserted into the female member so that it moves outwardly with the male coupling member more or less as a unit from the inner position (Fig. 2) to the locked position (Fig. 3) as the pressure comes on the line. With the other structures the gasket is free to slide over the ball as it is moved by the fluid pressure and moves the locking spring into position. However, the construction of the coupling parts shown in Figs. 1 to 4 may also be used with a freer-fitting gasket, such as that shown in Figs. 5, 6, 8, 10, 11, 12, 13 and 14.

Referring to Figs. 1 to 4, there are two pipes 10 and 11 which are to be coupled together. A male coupling element 12 is secured to the pipe 10, and a female coupling element 13 is secured to the pipe 11. The coupling members 12 and 13 may be bolted, welded or attached to the pipes 10 and 11 in any convenient way. Here, they are shown press fitted at 14 and 15 into the ends of their respective pipes.

Figures 1, 2, 3, 4:
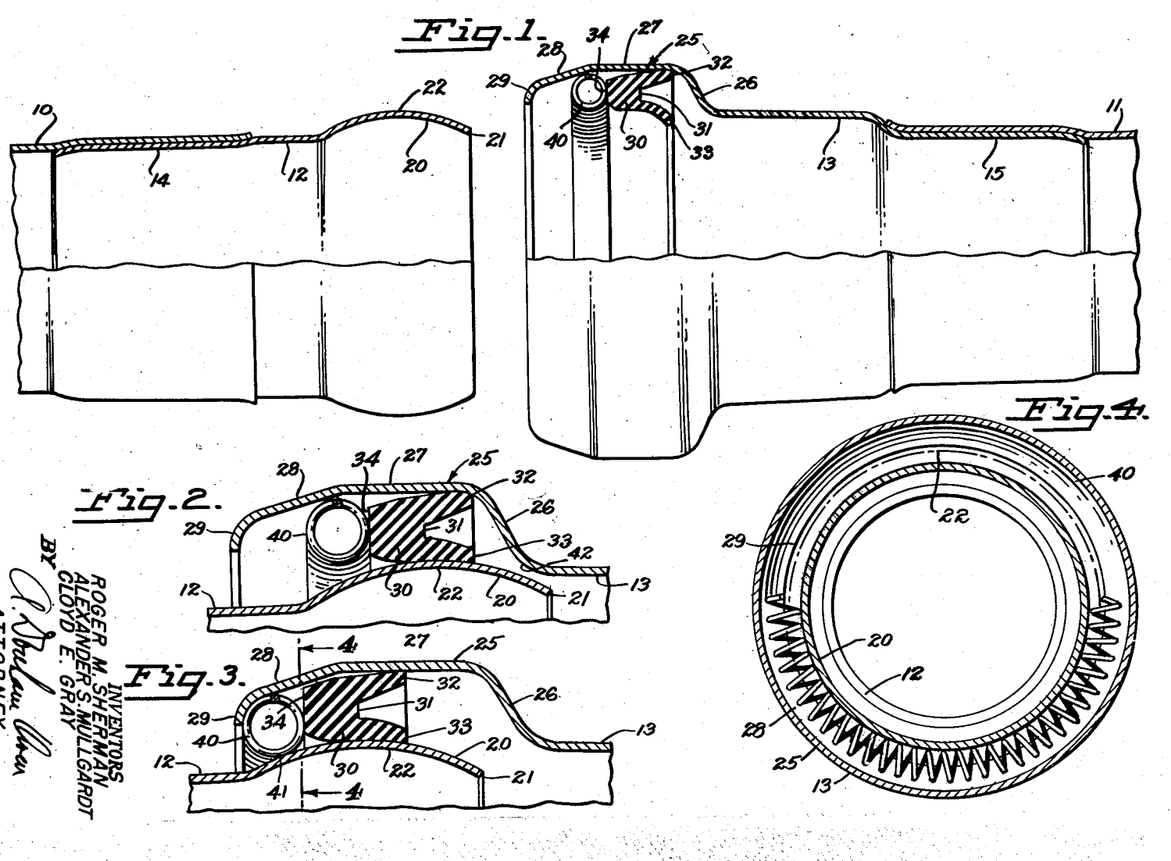
Fig. 1 is a view in side elevation partly in section showing the ends of two pipe sections, one having a male coupling element secured to it and the other a mating female coupling element, both constructed according to the principles of this invention. The pipes are shown apart, ready to be coupled together. In this form of the invention the inner gasket lip is made enough smaller than the spherical-ended male coupling element so that there will be a snug friction fit between these parts when they are engaged with each other.
Fig. 2 is an enlarged fragmentary view in section of the upper part of the coupling shown in Fig. 1 with the male coupling member inserted about all the way into the female coupling member; in this position the pipes are not yet locked, because no pressure has yet been put on the fluid in the pipe line.
Fig. 3 is a view similar to Fig. 2 with the coupling elements in locked position. Here the fluid pressure has moved the gasket and the male coupling member to the left, and as it did so the gasket moved the locking spring ahead of it and down into its locking position.
Fig. 4 is a view in cross-section on the same scale as Fig. 1, but with the parts in locked position. The view is taken in the direction indicated by the line 4—4 in Fig. 3; a portion of the spring is broken away to show the parts behind it. The dotted line 22 denotes the maximum diameter of the male element.

The male coupling element 12 comprises a head or ball portion 20 of approximately 30° included angle of a sphere. For four-inch pipe, the sphere may have a radius of about two and seven-sixteenths inches. Other sizes would be in proportion. The head 20 may be spun, or formed by dies, or made in any other convenient manner. Preferably the shape is substantially spherical, but it need not be exactly so, so long as it is generally ball-like. The outer end 21 of the ball 20 is shown as approximately the same diameter as the pipe 10. The portion 22 of widest diameter is shown about 25% larger in diameter.

The female coupling element 13 includes a widely flared sleeve or bell portion 25. From its press-fit end 15 the bell 25 is flared out somewhat radially at 26 and then axially to form a substantially cylindrical section 27 which is the widest portion of the bell. For a four-inch pipe this diameter may be about 6¼ inches. From the cylindrical section 27 the bell is tapered inwardly at 28 to form a substantially conical segment, and then it is bent inward radially to form a lip 29. The part played by these several portions of the bell will be explained presently.

Fitted into the bell 25 is a gasket 30 which may be split at 31 to form an outer lip 32 in engagement with the cylindrical portion of the bell 25, and an inner lip 33 which can engage the ball portion 20 of the male element 12 when that is inserted. There is also a substantial heel portion 34 from which the lips 32 and 33 extend. Preferably the gasket 30, if it is to have a snug fit on the ball 22, will have a relatively thick inner lip 33, and the inner edge of the lip at 33 (for a four-inch pipe) will be about ⅛ of an inch smaller in inside diameter than the maximum diameter 22 of the spherical ball. The outer lip 32 will be about 1/32 of an inch larger in outside diameter than the inside diameter of the cylindrical portion 27 of the bell. It will then slide easily in an axial direction within the portion 27 but will seal against the wall 27 to prevent any leakage through the joint to the outside.

Also inside the bell 25 and next to the gasket 30, is a garter type locking spring 40, usually made of a single piece of wire. When its ends are joined to form it into a ring its outside diameter is preferably large enough to prevent its falling out of the bell 25 and its inside diameter should be somewhat less than the outside diameter 22 of the ball. The diameter of the coils of the spring, as shown in Fig. 3, should be such that the spring 40 will rest in the bell end at 29, and the contracted inside diameter of the spring at 41 will be smaller than the outside diameter 22 of the ball 20. This gives a positive mechanical interlock.

Before the coupling elements are put together the spring 40 and gasket 30 are about as shown in Fig. 1. At least as the ball 20 starts to enter the bell 25 it will move the gasket 30 substantially against the outer end of the radially flared section 26. This will hold the gasket 30 in position while the ball 20 slides into a snug fit inside the gasket lip 33 as shown in Fig. 2. In this inward movement the ball 20 may come into contact with the inner end 42 of the radially flared section 26 which acts as a stop. The parts remain in this position until fluid is introduced into the pipe and a fluid pressure builds up.

When this pressure builds up in the pipe line each adjacent pair of pipes 10 and 11 will start to move apart axially with the result that coupling parts 12 and 13 move apart. Pressure could be held in the pipe line because in each coupling the lip 32 is sealed against the bell 25 and the lip 33 sealed on the ball 20. In the position shown in Fig. 2, the parts are sealed but are not yet interlocked.

The interlocking of the coupling ball 20 inside the bell 25 is effected as the fluid pressure in the pipe line presses against the gasket 30 and the snug fit of the lip 33 on the ball 20 combines with the axial movement of the ball 20 and of the bell 25 and causes the gasket end 34 to force the spring 40 along the tapered bell section 28, until the spring 40 seats against the lip 29 of the bell, as shown in Fig. 3.

The ball 20 is caught and locked by the spring 40 before the ball has moved too far out of the bell 25 because the spacing of the flange 26 in relation to the axial length of the gasket 30, the diameter of the spring 40, the spacing of the lip 29, and the distance the ball 20 can be inserted into the bell 25 is calculated so that when the ball 20 moves from its position as in Fig. 2 to its position as in Fig. 3, the spring 40 will have moved down the tapered portion 28 to engage the ball 20 in a positive mechanical interlock. If the spring 40 is seated against the lip 29 before the ball 20 engages the spring 40, the lip 33 will slide on the ball 20 to permit the parts to come into the position shown in Fig. 3. The coupling is now in positive locked position. Each coupling if let alone will remain securely locked, even when the fluid pressure drops to zero, because of the snug fit of the gasket lip 33 on the ball 20.

So long as each coupling is locked and contains fluid under some pressure the adjacent pipes and coupling members 12 and 13 may be misaligned about 12° in any direction without unlocking the coupling or causing any leaking. This means that a pipe line having a plurality of pipes each connected to its adjacent pipe with this coupling can be laid on uneven ground and in curved paths.

The pipe sections 10 and 11 are easily uncoupled when the fluid pressure is at zero. It is done by rotating one pipe relative to the other about its axis. This rotation moves the ball 20 relative to the bell 25 with the result that the convolutions of the coil spring locking ring are moved in angular relation to the radius of the ring and consequently the gasket 30 and the spring 40 move back into the cylindrical portion 27 of the bell and the ball 20 slides out of the embrace of the gasket lip 33 and out of the bell 25. A certain amount of movement of the coupling parts axially also facilitates the uncoupling.

Figure 5:
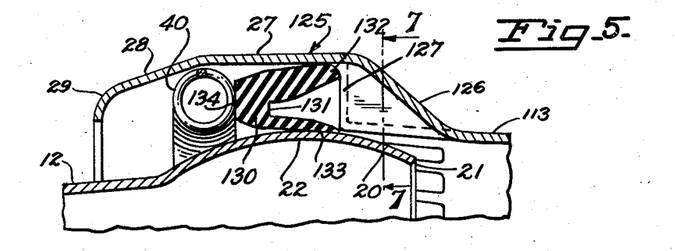
Fig. 5 is a view similar to Fig. 2 showing a modified form of the invention. The female element differs in the form of stop employed at its inner end to limit the movement of the gasket in that direction and also in that a looser fitting gasket is employed.
Figure 6:
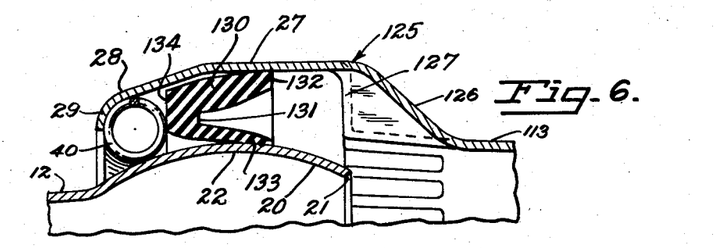
Fig. 6 is a view of the Fig. 5 modification similar to Fig. 3, with the coupling in its locked position.
Figure 7:
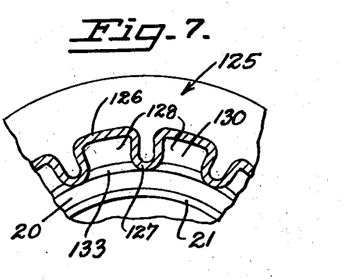
Fig. 7 is a fragmentary section taken along the line 7—7 in Fig. 5.

The form of the invention shown in Figs. 5 to 7 is basically similar to the one shown in Figs. 1 to 4 and like parts are similarly numbered. The bell 125 of the coupler member 113 is like the bell 25 of the coupler 13, except for the form of the stop for the gasket which is different from the flare 26 on coupler 13. This stop may comprise a ribbed portion 126, having vertical portions 127 to act as a stop for positioning the gasket 130 in relation to the ball 20. The recesses 128 permit the entry of fluid past the stop to the gasket 130. The cylindrical portion 27, the tapered portion 28, and the lip 29 are the same as in the device of Figs. 1 to 4.

In this modification the gasket is different in that its inner lip 133 is thin and is made with only about 1/32 of an inch smaller inside diameter than the outside diameter of the ball 20. The result is that there is enough contact of the lip 133 on the ball 20 and of the lip 132 on the cylindrical wall 27 to seal at these points, but the relatively light contact of the lip 133 on the ball 20 will cause the gasket to move as a piston between the wall 27 and the ball 20 and to push the spring 40 against the lip 29 well ahead of the ball 20 coming into contact with the spring 40.

The coupler 20 is inserted until it approaches or rests against the ribs 127, slipping easily past the gasket 130. (See Fig. 5.) When fluid pressure comes in the line the ball 20 and the bell 125 move apart, the gasket 130 moves more rapidly than the ball 20, because it has less mass and slides easily over the ball. The gasket 130 moves the spring 40 ahead of it and against the lip 29. The ball 20 continues to move until it is positively stopped by the spring 40. The joint is then secure and will hold until the couplers 12 and 113 are twisted relatively to each other, to permit the spring 40 to move back to its Fig. 5 position so the ball 20 is released.

Figure 8:
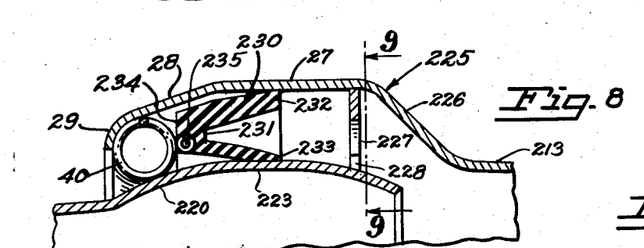
Fig. 8 is a view similar to Figs. 3 and 6 showing another modified form of the invention, with the parts in locked position. In this modification a different form of stop is shown, the gasket differs in having a small spring incorporated in its heel portion, and the male coupler also differs in that it has a short cylindrical portion to extend the spherical male member.
Figure 9:
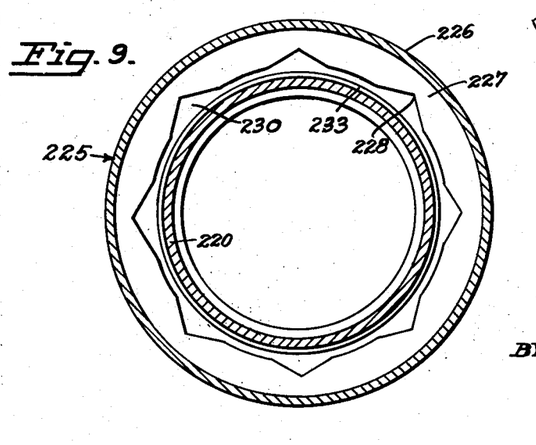
Fig. 9 is a view in section, on the scale of Fig. 1, of the complete coupling of the type shown in Fig. 8. The location of the section is indicated by the line 9—9 in Fig. 8. This view shows the the notched ring stop employed in this form of the invention.

The form of invention shown in Figs. 8 and 9 is similar in most respects to the form shown in Figs. 5–7. A different form of stop is employed, comprising a notched ring 227 which may be welded into a coupling 213 adjacent the cylindrical portion 27 of its bell 225, at the upper end of its radially flared portion 226. The ring 227 has a plurality of notches 228 along its inside circumference. These notches permit the passage of sufficient fluid pressure into the bell 225 to move the gasket 230.

Here, for purposes of illustration, a different form of male coupler 212 is also shown. The ball 220 is generally spherical but has a short cylindrical section 223 at the point of maximum diameter. This section 223 may be about 3/8 of an inch long for a four-inch pipe coupler. The cylindrical section 223 provides a low-friction surface over which the lightly pressing gasket 230 may slide more easily than over a true sphere.

The gasket 230 is split at 231 between its lips 232 and 233. Into its heel 234 is bonded, or otherwise incorporated, a small-diameter close-wound garter spring 235. This spring 235 provides a metallic wear surface in contact with the locking spring 40 and thereby protects the gasket 230 from being worn out too fast. The spring 235 is readily deformed for insertion of the gasket 230 and when inserted springs back into shape. For a four inch pipe, the spring may be about $\frac{3}{16}$ of an inch in outside diameter and be made from $\frac{1}{32}$ of an inch spring wire.

Figure 10:
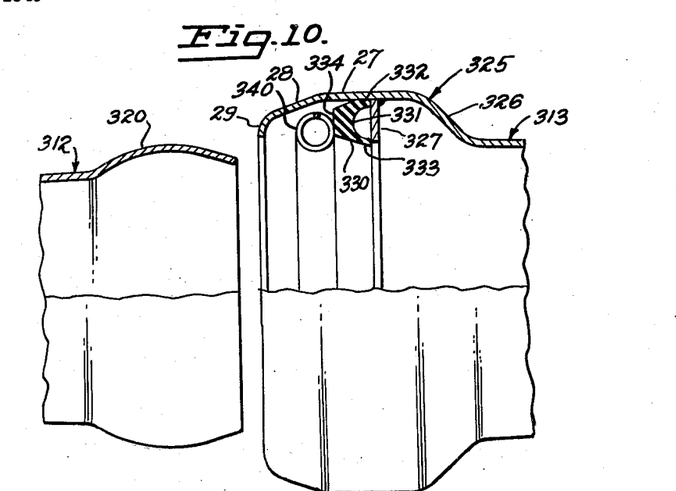
Fig. 10 is a view in elevation and partly in section similar to Fig. 1 showing another modified form of the invention. The pipes are shown apart ready to be coupled together. In this form of the invention the gasket has a loose sliding fit on the male member and moves axially farther than the inserted male member when the fluid pressure comes on the line. Also the locking spring in its "at rest" position has an inside diameter smaller than the outside diameter of the ball-like male member.
Figure 11:
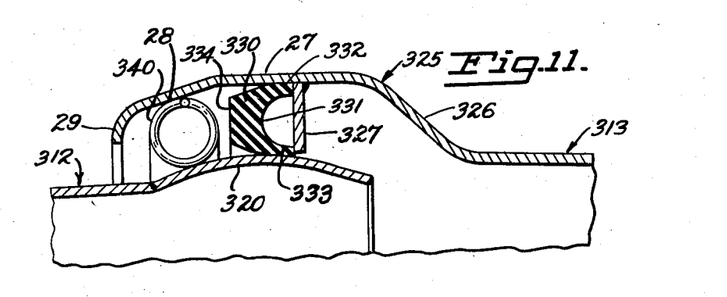
Fig. 11 is a view of the Fig. 10 modification similar to Fig. 2. The male coupler is shown inserted all the way into the female coupler, but the coupling is not yet locked because no pressure has been put on the fluid in the pipe line.
Figure 12:
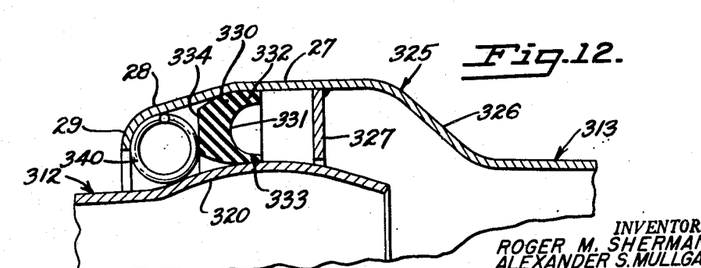
Fig. 12 is a view of the Fig. 10 modification similar to Fig. 3, with the coupling elements in locked position showing that the male member has moved very little axially over its position in Fig. 11.

Figs. 10–12 show another modified form of the invention, somewhat similar to the form just discussed in connection with Figs. 8 and 9, but having some other features. In some pipe lines where there are many sections joined together, the linear amount of outward axial movement at each coupling multiplied by the number of sections might be troublesome, so the present modification keeps this linear movement to a minimum.

Here the couplers are denoted by the numbers 312 and 313. The bell 325 of the female coupler 313 is generally similar to the bell 225, but the stop ring 327 is welded to it further along the cylindrical section 27, instead of near its radially flared portion 326. The reason for this is that the bell 320 in this modification is to have a very short end play, or linear movement between its maximum inserted position and its locked position. The gasket 330 rests against the stop ring 327 when the couplings are unjoined (Fig. 10) or when the male coupler is fully inserted (Fig. 11). The gasket 330 is split at 331 to provide two easily deflected lips 332 and 333. Its heel 334 abuts the spring 340.

In this modification the spring 340 has an inside diameter substantially smaller than the outside diameter of the ball 320, even when the spring 340 is in its relaxed position (see Fig. 10). Its diameter is however, large enough so that it will not fall out of the bell 325.

When the ball 320 is inserted, it expands the spring 340 and by the time the ball touches the stop 327, the spring 340 will have passed over the top of the ball and will have moved itself down on the ball as it contracts (see Fig. 11). When the fluid pressure comes on, it immediately moves the gasket 330 toward the spring and pushes the spring into its locking position, all before the pressure is sufficient to move the coupling members apart. The ball 320 will move only about 1/8 of an inch during this locking step, in contrast with approximately 5/8 of an inch for the other forms shown. This becomes important in long strings of pipe where the expansion in the line should be limited. An expansion of 5/8 of an inch at each joint may become several feet in a long string composed of many sections. With this modified form of the invention the expansion will be slight and not of much consequence.

Another feature of this form of the invention is that the inside diameter of the spring 340, being substantially smaller than the outside diameter of the ball, the pipe will remain coupled under quite strong pulling forces even when there is no fluid under pressure in the pipe line. Thus a string of pipe, already coupled, may be dragged around a field by a tractor with a substantial saving in time, where heretofore each section had to be uncoupled and recoupled in the new location. A four-inch pipe of this type has been subjected to a 2500 pound pull without coming apart or damaging the coupling. Curiously enough, when it is desired to uncouple a section it can be done by rotating one coupling member relative to the other while exerting a slight axial pull.

Still another advantage of this form of the invention is derived from the support which the ring 327 gives to the ball 320. If pipe has to lie in the open field under a beating sun, temperatures of 150° and more may be developed. When the gasket alone is the sole support for the male coupler, as in the couplings shown in Figs. 3, 6, and 8, this heat and weight may cause a permanent set of deformation in the gasket and a leak may develop. A new gasket will then be needed. Fig. 12 shows that the clearance between the ring 327 and ball 320 in this form of the invention is slight, and on the bottom side the ball 320 will in time come to rest on the ring 327. This limits its ability to further deform the gasket and the life of the gasket is prolonged.

Figure 13:
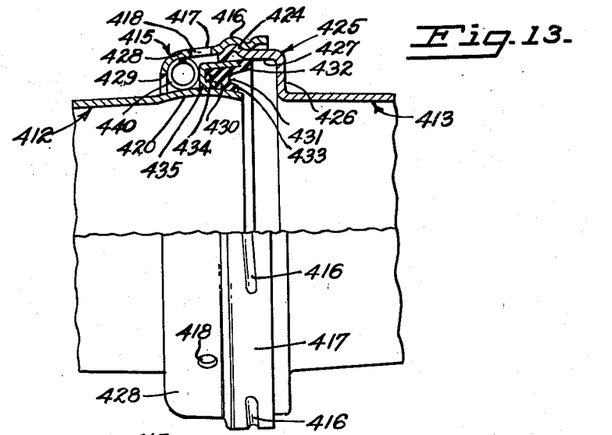
Fig. 13 is a view in elevation and partly in section of another modified form of the invention, having a two-part severable bell. The coupling is here shown in its locked position, with the two parts of the bell joined together.
Figure 14:
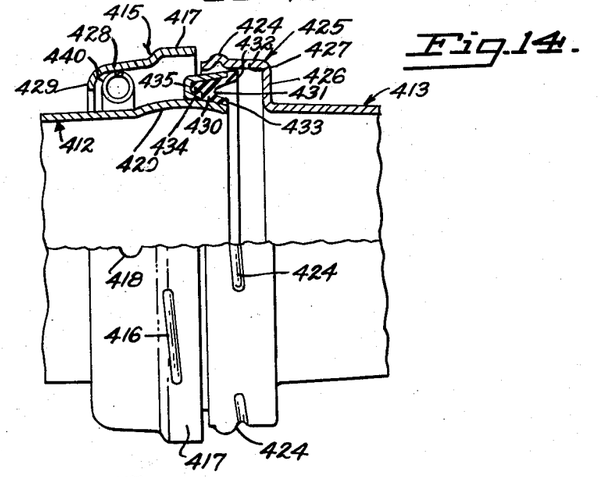
Fig. 14 is a view similar to Fig. 13 showing the two parts of the bell disconnected so that the pipe can be disconnected even when the fluid pressure in the pipe might prevent the ball from being withdrawn from the bell in the normal manner.
Figure 15:
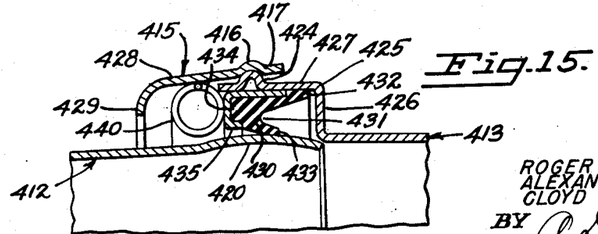
Fig. 15 is an enlarged fragmentary view in section of the device of Figs. 13 and 14 shown with the parts in inserted but unlocked position, similar to Fig. 2.

The modification shown in Figs. 13 to 15 is particularly well suited to the solution of another type of problem which occurs with irrigation pipe. Sometimes couplings of the types heretofore described cannot be uncoupled easily after the water ceases to flow. This is true in the case where a string of pipe dips down into and out of a gully. In this case there is considerable standing water pressure in the line just from the water it contains. This will be especially true on hilly land where the couplings in valleys will have a high gravity pressure. When couplings of the types previously shown are twisted in the way which normally will uncouple them, the fluid pressure against the gasket prevents the gasket and the locking spring from moving back to release the male coupler. The apparatus of Figs. 13 to 15 is addressed to this problem.

Here the male coupler 412 is substantially like the coupler 12, having a ball-like portion 420. The female coupler 413 is different. It is made in two pieces, with a ring section 415 and a base section 425, having intermittent mating threads 416 and 424, by which they may be joined together or taken apart.

The coupler base section 425 has a radially-flared substantially vertical shoulder 426, and a cylindrical section 427, where the intermittent threads 424 are located near the outer edge. The coupler ring section 415 includes a short cylindrical portion 417, with the intermittent threads 416 and a plurality of holes 418 where a spanner wrench may be inserted for turning the ring section 415 relatively to the base section 425 to connect or disconnect the parts. The ring section 415 also has the inclined, inwardly tapered, substantially conical section 428 which is bent inwardly to form a lip 429.

The gasket 430 is split at 431 into an outer lip 432 and an inner lip 433. Its heel 434 and a portion of its outer lip 432 are covered with a protecting metal wear member 435, which may be vulcanized or cemented to the gasket 430. A portion of the lip 432 projects beyond the wear member 435, and seals against the outer wall 427 of the bell. The movement of the gasket 430 to the right is limited by the shoulder 426. The wear member 435 is in contact with the locking spring 440.

This coupler works like those already described, except for one feature. If the pressure of water standing in the pipes prevents the normal uncoupling, the pipes can be uncoupled by inserting a spanner wrench into the holes 418 and rotating the ring section 415 relatively to the base section 425. The intermittent threads will disengage and the ring section 415 will separate from the base section 425. (See Fig. 14.) The spring 440 will then slide out on the ball 420 as the latter is removed from the female member. The spring 440 and ring section 415 may be removed from the ball 420, and the ring section 415 may be rethreaded in place of the base section 425.

All the couplings described in this application are characterized by their ability to be displaced angularly without causing leaks, without causing the joint to become uncoupled, and without bringing restorative forces into play which would tend to make the coupling members come into axial alignment. The fact that the male element is substantially a ball where it is engaged by the locking spring, means that disalignment of two adjacent sections of pipe will not affect the locking action of the spring. Nor will this interfere with the gasket's sealing ability. The ball cannot transmit any force which would tend to make the pipe sections move from the deflected position in which they were set when first coupled together.

Figure 16:
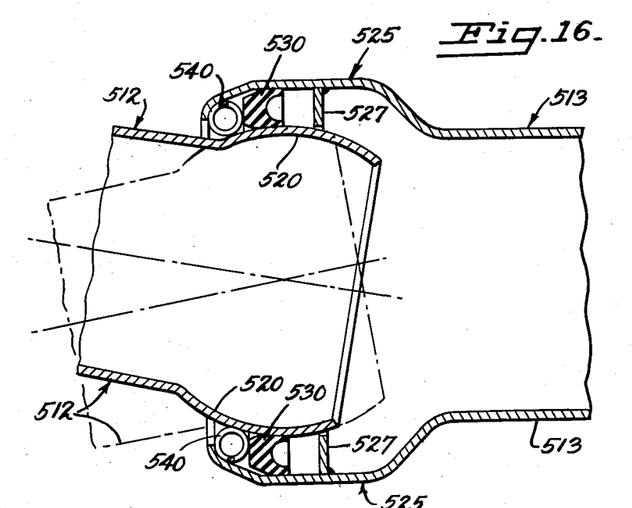
Figure 17:
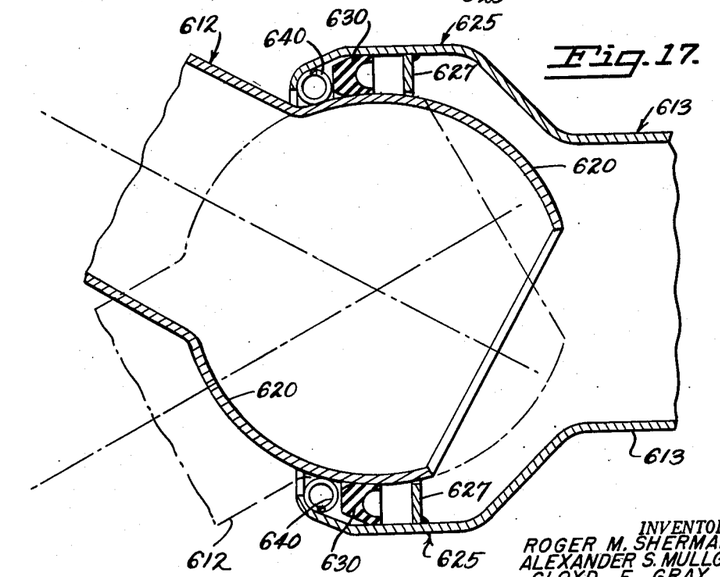

This is illustrated in Figs. 16 and 17 where two pairs of couplers are shown displaced. The displacement in the upper direction is shown in full lines in section and the displacement in the lower direction is shown in dotted lines. As illustrated here, the diameter of the ball portion, the number of degrees of included angle of the spherical segment, will be substantially the angle of total equilibrium angular displacement. Where the angle is 15°, about 7½° displacement is possible in each direction. Where the angle is about 30°, about 15° displacement in every direction is possible.

In Fig. 16 the ball 520 of the male coupler 512 is shown in its extreme positions of axial disalignment. The bell 525 of the female coupler 513 includes a stop ring 527 and has a gasket 530 and spring 540. In all positions of the ball 520 there is the same pressure on the gasket 530 and the spring 540, and there is no tendency for the coupling to come apart or to straighten itself back into alignment, because the ball 520 is substantially spherical. The ball 520 will also tend in all positions to rest on the stop ring 527, and thus the strain on the gasket 530 is not increased when the pipe is disaligned.

In Fig. 17 the pipe is the same size as the pipe in Fig. 16, but the ball 620 of the coupler 612 is of larger diameter. The female coupler 613 is correspondingly larger, its bell 625, stop ring 627, gasket 630 and spring 640 also being larger. As a result further stable disalignment is possible, as the drawing shows. The angle here is substantially larger than in the coupling in Fig. 16. The coupling remains stable in its disaligned positions and it is free from restorative torque as well as free from strain on the gasket, spring, etc. It will not become uncoupled by this disalignment.

Having described and illustrated several embodiments of the invention, we claim as our invention:

1. A readily separable, positive interlocking pressure actuated pipe coupling comprising telescopically arranged bell and spigot portions; the spigot portion having an annular enlargement providing a generally spherical surface facing the free end of the bell portion, the bell portion having an interior compression wall sloping toward its free end and toward the axis of the portions and terminating in an inturned flange at the free end thereof, and having an internal diameter greater than the external diameter of said enlargement; a deformable resilient locking element within said bell portion having a plurality of radially extending circumferentially spaced substantially radially rigid narrow locking portions resiliently connected into an annulus in which each such narrow portion is deflectable out of its locking position upon relative rotation of said bell and spigot portions about their longitudinal axis, and which locking element when in locking position against said inturned flange has an effective inside locking diameter less than the outside diameter of said annular enlargement; and an annular pressure responsive gasket having rearwardly extending sealing lips, slidable within the bell portion rearwardly of said locking element and engageable with said spigot portion and initially operative upon pressure being applied tending to separate the portions to move said locking element along said wall to said flange and compress said locking element into operative interlocking engagement with said enlargement and said flange.

2. The coupling according to claim 1, in which said locking element is a helically wound coil spring.

3. The coupling according to claim 1 in which the inner lip of said annular gasket has a free sliding fit on the enlargement on said spigot portion, so that the gasket will move relatively faster toward the flange on said bell portion than does said enlargement when fluid pressure is introduced into the coupling.

4. The coupling according to claim 1 in which said bell portion consists of two pieces with said sloping compression wall and said inturned flange comprising one of said pieces, and means for releasably securing said last named piece to the other piece, whereby said last named piece may be removed for separation of said coupling regardless of the existence of fluid under pressure in the coupling.

ROGER M. SHERMAN.
ALEXANDER S. MULLGARDT.
CLOYD E. GRAY.

References Cited in the file of this patent

UNITED STATES PATENTS

| Number | Name | Date |
|---|---|---|
| 2,259,453 | Beyer | Oct. 21, 1941 |
| 2,398,399 | Alexander | Apr. 16, 1946 |
| 2,460,032 | Risley | Jan. 25, 1949 |